(12) United States Patent
Trolese et al.

(10) Patent No.: US 9,091,403 B2
(45) Date of Patent: Jul. 28, 2015

(54) NIGHT LIGHT

(71) Applicant: Pass & Seymour, Inc., Syracuse, NY (US)

(72) Inventors: Lorenzo Trolese, Camillus, NY (US); Richard M Rohmer, Jordan, NY (US); Lam Chung Fai, Kowloon (CN); Leung Kwok Chung, North Point (CN); Joshua Haines, Marcellus, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 139 days.

(21) Appl. No.: 13/836,780

(22) Filed: Mar. 15, 2013

(65) Prior Publication Data

US 2014/0140064 A1    May 22, 2014

Related U.S. Application Data

(63) Continuation-in-part of application No. 13/680,675, filed on Nov. 19, 2012.

(51) Int. Cl.
*H01H 9/02* (2006.01)
*H01H 13/04* (2006.01)
*H01H 19/04* (2006.01)
(Continued)

(52) U.S. Cl.
CPC ............... *F21S 8/024* (2013.01); *H01H 23/00* (2013.01); *H02G 3/12* (2013.01)

(58) Field of Classification Search
CPC ......... F21S 8/024; H01R 13/518; H02G 3/12; H05K 5/02
USPC ................... 174/53, 250, 267; 361/749, 828; 257/88, E33.054; 362/95
See application file for complete search history.

(56) References Cited

U.S. PATENT DOCUMENTS 4,546,419 A * 10/1985 Johnson .......................... 362/95
6,808,283 B2 * 10/2004 Tsao ............................... 362/95
(Continued)

FOREIGN PATENT DOCUMENTS

| EP | 1584096 B1 | 6/2007 |
| EP | 1866944 B1 | 6/2011 |
| IT | 00247057 | 6/1999 |

OTHER PUBLICATIONS

Legrand Vela, Pull Out Emergency Torch With Automatic Switch-On Device, p. 1, 1999.
(Continued)

*Primary Examiner* — Yuriy Semenenko
(74) *Attorney, Agent, or Firm* — Daniel P. Malley; Bond Schoeneck & King, PLLC

(57) ABSTRACT

The present invention is directed to an electrical device that includes a control circuit having a processing circuit, an electronic switch, light emitting elements and an ambient light sensor disposed on a substrate. The processing circuit provides an electronic barrier between the light emitting elements and the ambient light sensor such that the operation of the ambient light sensor is not contaminated by light emitted by the plurality of light emitting elements. A cover assembly includes a lens element and a switch actuator comprised of a diffusing material. The lens element and the switch actuator are disposed over the light emitting elements such that the light emitted by the light emitting elements is diffused by the lens element and the switch actuator to emit a substantially uniform illumination without any shadow or hot spot artifacts being visible on either the lens element or the switch actuator.

20 Claims, 11 Drawing Sheets

(51) Int. Cl.
 *F21S 8/02* (2006.01)
 *H01H 23/00* (2006.01)
 *H02G 3/12* (2006.01)

(56) References Cited

U.S. PATENT DOCUMENTS

| | | | |
|---|---|---|---|
| 6,989,489 B1 | 1/2006 | Savicki, Jr. | |
| 7,102,172 B2 * | 9/2006 | Lynch et al. | 257/79 |
| 7,188,235 B2 | 3/2007 | Wang et al. | |
| 7,213,932 B1 | 5/2007 | Savicki, Jr. | |
| 7,285,721 B1 | 10/2007 | Savicki, Jr. | |
| 7,360,912 B1 | 4/2008 | Savicki, Jr. | |
| 7,543,941 B2 | 6/2009 | Holder et al. | |
| 7,586,718 B1 | 9/2009 | Radosavljevic et al. | |
| 7,724,557 B2 | 5/2010 | Ganta et al. | |
| 7,758,234 B1 | 7/2010 | Savicki, Jr. et al. | |
| 7,790,982 B2 | 9/2010 | Weeks et al. | |
| 7,862,350 B2 | 1/2011 | Richter et al. | |
| 7,869,171 B2 | 1/2011 | Weeks et al. | |
| 7,939,837 B2 * | 5/2011 | Lynch et al. | 257/88 |
| 7,990,252 B2 | 8/2011 | Barton | |
| 7,999,485 B1 | 8/2011 | Richards et al. | |
| 8,120,882 B1 | 2/2012 | Radosavljevic et al. | |
| 8,194,368 B2 | 6/2012 | Weeks et al. | |
| 8,393,747 B2 * | 3/2013 | Kevelos et al. | 362/95 |
| 8,444,309 B2 | 5/2013 | Jansen et al. | |
| 8,629,617 B2 | 1/2014 | Richards et al. | |
| 8,698,026 B2 | 4/2014 | Roceereto | |
| 2003/0021104 A1 * | 1/2003 | Tsao | 362/95 |
| 2009/0086488 A1 * | 4/2009 | Lynch et al. | 362/249.02 |

OTHER PUBLICATIONS

Bticino, Living International, pp. 1-50, 1998.

* cited by examiner

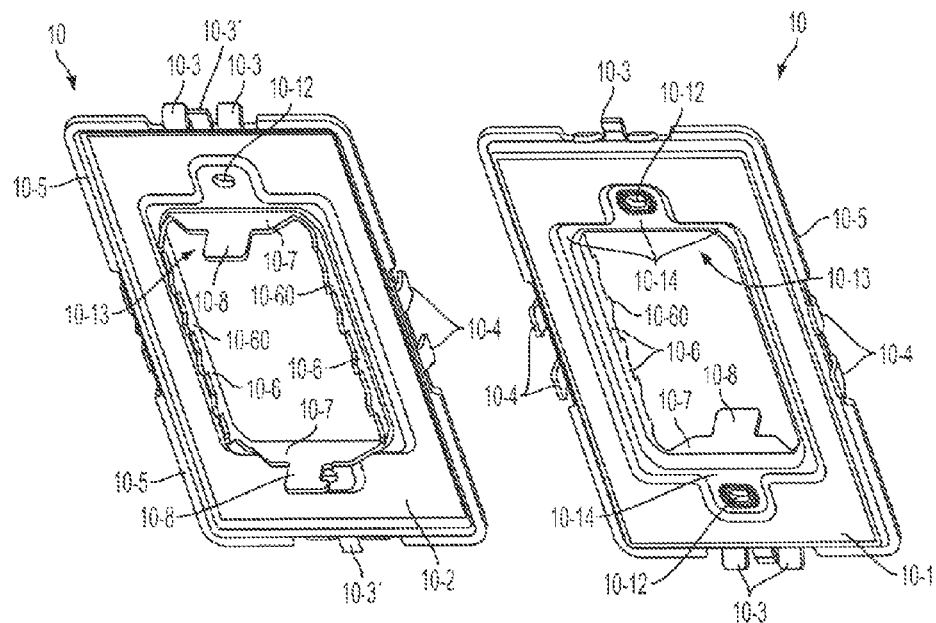
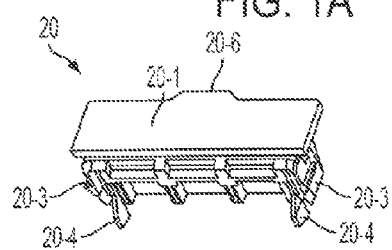
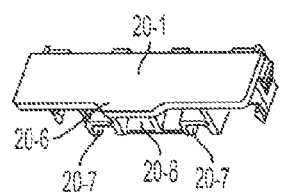
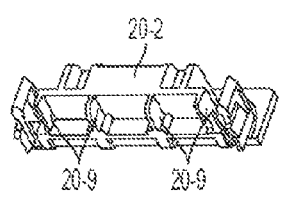
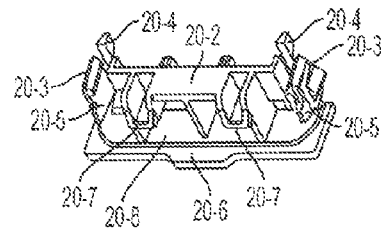

NIGHT LIGHT

CROSS-REFERENCE TO RELATED APPLICATIONS

This is application is a continuation-in-part of U.S. patent application Ser. No. 13/680,675 filed on Nov. 19, 2012, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to electrical wiring devices, and particularly to electrical wiring devices with a night light.

2. Technical Background

The typical layout of a room, whether it is in a public space, a living space or a commercial space, provides a wall light switch disposed adjacent to the point of entry. In a scenario that most people are familiar with, a person crossing the threshold of a darkened room will usually attempt to locate the wall switch and turn the wall switch to the ON position before entering. Sometimes the wall switch is not located in this position and the person seeking access to the room must search for the light switch. The person searching for the wall switch is required to navigate around objects such as tables and chairs. Usually, a person entering the room attempts to "feel" their way around the room. If an object is disposed relatively low to the floor surface the person may trip over it and suffer an injury.

Of course, there are situations where a light switch is not available, or is not readily available. There are other situations where the person entering the darkened room is disinclined to turn the lights ON as a matter of courtesy.

Consumers often insert a portable lighting device into an electrical receptacle located in the room and function as a temporary lighting device. While this arrangement may provide adequate illumination and temporarily mitigate a potentially unsafe condition, it has certain drawbacks associated with it. Temporary lighting devices are aesthetically unappealing and have a makeshift look and feel. Moreover, if the temporary lighting device is plugged into the receptacle for an extended period of time the lighting bill could be excessive over time. The user may attempt to address this problem by unplugging the temporary lighting device during daylight hours if the space admits natural light. However, once the temporary lighting device is unplugged from the receptacle there is the possibility that it will become lost, misplaced, or damaged from excessive handling.

A light element may be disposed in a wiring device in combination with another functional element such as a receptacle or a light switch. The wiring device is subsequently installed in a wall box or mounted to a panel. While this approach obviates some of the drawbacks described above, there are other drawbacks that come into play. Conventional permanent lighting elements such as incandescent and neon lights have a relatively short life expectancy of only a few years and, therefore, require periodic servicing and/or replacement. This problem is exacerbated by the fact that the light is typically hard-wired to power contacts disposed in the wiring device. As such, the light element is permanently ON, further limiting the light elements life expectancy.

In yet another approach that has been considered, the aforementioned drawbacks are addressed by providing "night light" that has a light sensor, and the associated circuitry, to control the light element. When the sensor detects the ambient light level falling past a certain point, the control circuit turns the light element ON. One design problem associated with using a light sensor to selectively actuate the light element relates to providing a proper degree of isolation between the light sensor and the light element. Conventional devices solve the problem by separating the light sensor and the light element by as great a distance as possible. One drawback to this problem is that the lighting assembly must be reduced in size to provide sufficient distance between the light sensor and the lighting elements. Thus approach, therefore, often provides an inadequate amount of illumination and does not address the safety issues described above.

In yet another approach, the light sensor is disposed in an enclosure that shields it from the lighting elements. The drawback to this approach is that the user can see the light sensor and it takes away from the visual appeal of the device.

What is needed is an electrical device configured to address the drawbacks and needs described above. In particular, a light emitting wiring device is needed that provides a sufficient amount of illumination when the ambient light in a given space falls below a safe level. A wiring device is needed that maximizes the effective area of illumination without sacrificing sensor isolation. What is also needed is an electrical wiring device that addresses the safety issues described above, while at the same time, providing user-accessible adjustment mechanisms with an eye toward energy efficiency. Finally, what is needed is a night light device that does not sacrifice aesthetics for sensor functionality.

Turning now to another consideration, there are several drawbacks associated with conventional installation methods and conventional protective electrical wiring devices. Conventional protective electrical wiring devices often do not make efficient use of space. In addition, mounting the wiring device's ground strap to the device box is tedious, time consuming, and therefore costly. The same can be said of mounting the cover plate to the electrical wiring device. Moreover, in multi-gang installations, the finished look is often ragged because the plurality of electrical devices and their respective cover plates are typically not in alignment. This misalignment can be, and very often is, in all three dimensions. Retrofitting an electrical installation can also be problematic from the standpoint of the finished look because the device box, or an old work box, may not be precisely aligned to the plane of the wall surface. This is especially true if the wall surface itself is uneven. After remodeling a space, homeowners often seek to replace an existing wall plate with one that better matches the new décor. Thus, a homeowner may inadvisably remove the faceplate cover from an energized wiring device and inadvertently become exposed to a shock hazard from the "hot" electrical wiring.

What is needed, therefore, is an electromechanical switch mechanism that obviates the drawbacks articulated above. In particular, what is needed is an electromechanical switch that is substantially quiet and easy to operate, having a small angle of rotation between switch positions. A switch of this type is also needed that can be employed in a number of different form factors including one suitable for use in a modular framing system such that it does not require fasteners to be securely installed within the device box.

SUMMARY OF THE INVENTION

The present invention addresses the needs described above by providing an electrical device configured to address the drawbacks and needs described above. In particular, the present invention is directed to a light emitting wiring device that provides a sufficient amount of illumination when the ambient light in a given space falls below a safe level. The present invention maximizes the effective area of illumination without sacrificing sensor isolation. The electrical wiring device of the present invention also addresses the safety issues described above, while at the same time, providing user-accessible adjustment mechanisms that are energy efficient. Finally, the present invention is directed to a night light device that does not sacrifice aesthetics for sensor functionality.

One aspect of the present invention is directed to an electrical device configured to be installed within a device box. The device includes a housing including a plurality of terminals configured to be coupled to an AC power source. A control circuit is disposed in the housing, the control circuit including a processing circuit, an electronic switch, a plurality of light emitting elements and an ambient light sensor disposed on a substrate. The ambient light sensor is disposed proximate the plurality of light emitting elements on the substrate. The ambient light sensor is configured to provide the processing circuit with ambient light data. The processing circuit is configured to provide an electronic barrier between the plurality of light emitting elements and the ambient light sensor such that the operation of the ambient light sensor is not contaminated by light emitted by the plurality of light emitting elements. A cover assembly is coupled to the housing and includes a lens element covering substantially the entire front face of the device. The lens element includes an opening accommodating a switch actuator coupled to the electronic switch. The lens element and the switch actuator are comprised of a diffusing material. The lens element and the switch actuator are disposed over the plurality of LED lighting elements such that the light emitted by the plurality of light emitting elements is diffused by the lens element and the switch actuator to emit a substantially uniform illumination without any shadow or hot spot artifacts being visible on either the lens element or the switch actuator.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIGS. 1A-1B, perspective views of a frame member 10 in accordance with the present invention;

FIGS. 2A-2D, perspective views of a modular alignment connector 20 in accordance with the present invention;

DETAILED DESCRIPTION

Figure 3A:
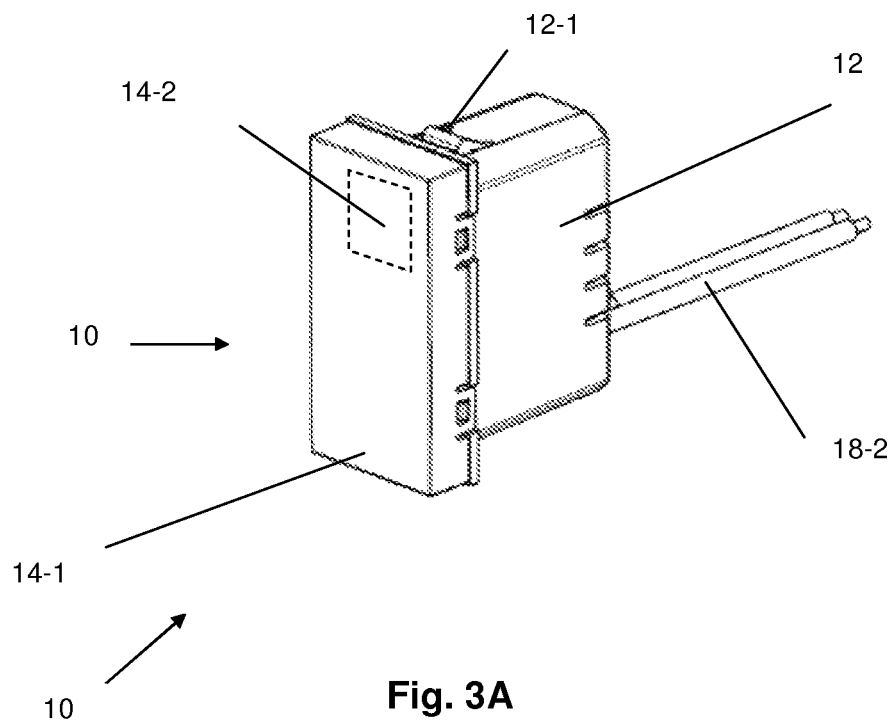
FIGS. 3A-3B are perspective views of the device in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the switch of the present invention is shown in FIG. 4, and is designated generally throughout by reference numeral 100.

As embodied herein, and depicted in FIGS. 1A-1B, perspective views of a frame member 10 in accordance with the present invention are disclosed. FIG. 1A is directed to the rear side 10-2 of the frame member 10, whereas FIG. 1B is directed to the front side 10-1 of the frame member 10. The frame member 10 is configured to "complete the electrical enclosure" when one or more modular electrical devices (30, 40 or 50) and/or modular alignment connectors 20 are properly installed within the frame opening 10-13 such that the device wall box interior is substantially inaccessible. Stated differently, instead of using a conventional wall plate to complete the enclosure, the frame member 10 is used to prevent individuals from being shocked or electrocuted by concealing all electrical wiring under the frame 10 within the device wall box interior.

Thus, a frame enclosure lip 10-5 is disposed around the perimeter of the frame 10. The frame enclosure lip 10-5 is configured to substantially abut the wall surface 1 (not shown in this view) such that a front edge of a properly installed wall box does not substantially touch the rear side 10-2 of the frame 10. This is true even when old work boxes are deployed. Old work boxes, of course, have flanges that are mounted to the outer surface of the wall surface 1. The frame enclosure lip 10-5 raises the rear surface 10-2 overtop the work box to avoid any interference with the flanges and prevent the frame 10 from contacting the wall surface 1.

As shown, the frame 10 includes a frame opening 10-13 that has an interior serrated edge or lip 10-6 that is configured to mate with the modular alignment conductors 20 and/or the electrical wiring devices (night light 10 or other electrical wiring devices) in the manner disclosed below. Once the electrical wiring device and/or the modular alignment connectors are installed within the frame opening 10-13, the enclosure is completed. The interior serrated lip 10-6 extends along lateral portions of the frame opening 10-13 to adjoin a connector landing element 10-7 disposed at either end of the frame opening 10-13. The interior serrated lips 10-6 and the connector landing elements 10-7 extend perpendicularly around the entire frame opening 10-12 to form a rim or skirt that is inserted inwardly within the device box interior during installation. Accordingly, the region under the rear frame surface 10-2 between the outer enclosure lip 10-5 and the interior rim (i.e., serrated lips 10-6 and landing 10-7) is disposed over the wall surface 1. Once the wall box fasteners 10-10 are inserted into the fastener slots 10-12 and tightened, the interior of the device box is accessed via the frame opening 10-13. After device installation, however, the frame opening 10-13 is completely occupied by some combination of modular wiring devices including switch 100 and/or modular alignment connectors 20 to thereby complete the enclosure. All of the wiring is under the frame assembly and cannot be accessed. Because the frame completes the overall enclosure, no wall plate need be employed by the present invention; the wall plate is replaced by an aesthetic overlay that can be removed at any time without exposing the homeowner to shock or electrocution. As its name suggests, the aesthetic overlay of the present invention may be comprised of a variety of decorator materials without regard to the structural considerations that are concomitant with completing the enclosure. Finally, because the frame of the present invention completes the overall enclosure, it may be employed with new construction, old construction or retrofits.

As embodied herein and depicted in FIGS. 2A-2D, perspective views of a modular alignment connector 20 in accordance with the present invention are disclosed. The modular alignment connector 20 is said to be modular because it adjusts and aligns the size of the frame opening such that various combinations of wiring devices (e.g., 30, 40, and 42) disposed in a variety of spatial orientations are used to complete the frame opening 10-13 when they are installed therein.

FIG. 2A shows a front major surface 20-1 of the modular alignment connector 20 (when it is inserted within the frame opening 10-13). The front major surface 20-1 of the modular alignment connector 20 has a width of approximately 11.2 mm and a length of about 45 mm. One pair of the alignment connectors 20 are the same size as a one-module electrical wiring device. The front major surface 20-1 includes a front connector flange 20-6 which is configured to fit within the frame connector seat 10-14 when the connector is inserted within the frame 10. The modular alignment connector 20 also includes bending snap arms 20-3 and spacer tangs 20-4 disposed on either side of the connector 20. A spacer channel 20-5 is disposed between the snap arm 20-3 and the spacer tang 20-4. As their name suggests, the snap arms 20-3 are used to "snap" the alignment connector 20 into the frame opening 10-13. Subsequently, the spacer tang 20-4 is pressed into the spacer channel 20-5 to lock the modular alignment connector 20 into the frame opening 10-13. The locked snap arms 20-3 retain the alignment connector 20 within the frame opening 10-13 thereafter. Stated differently, when a spacer tang 20-4 is inserted into a channel 20-5, the snap arm 20-3 can no longer deflect inwardly and thus cannot be removed from place. The snap connect assembly (20-3, 20-4, and 20-5) is configured to withstand at least 50 foot-pounds of pulling force.

Reference is made to U.S. patent application Ser. No. 13/680,675, which is incorporated herein by reference as though fully set forth in its entirety, for a more detailed explanation of the frame member 10.

FIG. 2B shows the modular alignment connector 20 rotated 180° with respect to the view provided by FIG. 2A. The front stabilizing plate 20-6 and the rear connector flanges 20-7 form a connector channel 20-8 that is configured to grip the frame connector landing 10-7 (See FIGS. 1A-1B). The front stabilizing plate 20-6 is seated on the frame connector seat 10-14 when the alignment connector 20 is inserted into the frame opening 10-13. The purpose of the front stabilizing plate 20-6 is to help the connector 20 retain its position within the frame opening 10-13 by preventing it from being pushed inwardly and through frame opening 10-13.

FIG. 2C is a rear view of the modular alignment connector 20. This view shows a rear major surface 20-2 that is supported underneath by device stop elements 20-9. Like the serrated stop elements 10-60 of the serrated lip 10-6, the device stop elements 20-9 are configured to engage and mate with the device snap elements formed in the modular wiring device housing (See elements 30-2, 40-2, etc., depicted in FIG. 5) to complete the electrical enclosure. This snap-fit arrangement fixes the modular wiring device (30-2, 40-2) within the opening 10-13 such that it cannot move laterally or longitudinally within the frame opening 10-13 when snapped in place. Stated differently, the interior serrated lips 10-6 and device stop elements 20-9 serve to secure and align the electrical wiring device (30, 40, 50, etc.) within the frame opening 10-13.

FIG. 2D shows the modular connector 20 rotated 180° with respect to the view provided by FIG. 2C. When inserted into the frame opening 10-13, the rear stabilizing plate 20-7 bears against edges of the connector landing 10-7 (See FIGS. 1A-1B). Again, the front stabilizing plate 20-6 and the rear stabilizing plate 20-7 form a channel 20-8 that restricts the movement of the modular alignment connector 20 after being seated on the connector seat 10-14. As the connector 20 is moved to this seated position, bending snap arms 20-3 are deflected inwardly by the interior serrated lip 10-6 until they clear and snap back outwardly into the serrations. Again, the bending snap arms 20-3 prevent the connector 20 from sliding or moving out of its seated position.

Reference is made to U.S. patent application Ser. No. 13/680,675, which is incorporated herein by reference as though fully set forth in its entirety, for a more detailed explanation of the modular alignment connector 20.

Figure 3B:
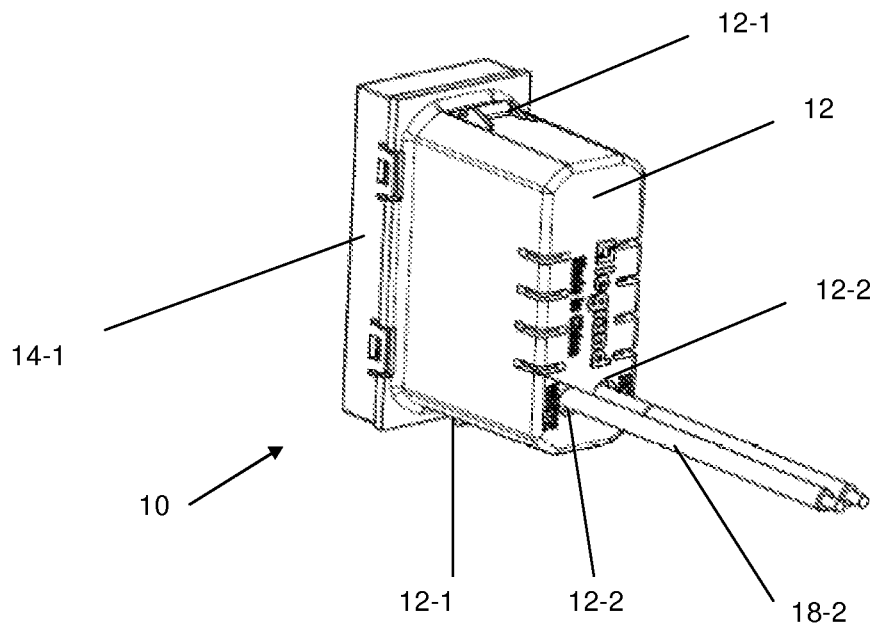

As embodied herein and depicted in FIGS. 3A-3B, perspective views of the device 10 in accordance with one embodiment of the present invention are disclosed. In this embodiment, the nightlight 10 is configured as a one module device that occupies only one-third of the entire frame (See FIGS. 1A-1B, and 2A-2D). Accordingly, device 10 can be disposed within the frame 10 with another two-module device or with two additional one module devices. Alternatively, device 10 can be paired with another one module device and the two modular alignment connectors depicted in FIGS. 2A-2D.

The device 10 includes a front cover 14 that includes a switch portion 14-2 disposed within the front lens 14-1. The switch 14-2 and the lens 14-1 are formed from the same material and the switch 14-2 is arranged such that it is substantially flush with respect to the lens 14-1. The dotted line indicates that the switch 14-2 and the lens 14-1 are so closely matched in appearance that it is difficult to distinguish the two elements without a close inspection thereof. The front cover 14 is coupled to the back body 12. The back body 12 includes snap elements 12-1 that are configured to mate with the frame 10 and the modular connectors 20 shown in FIGS. 1-2. FIG. 3B is a rear perspective view of the device 10 and further shows a plurality of AC terminals 12-2 used to connect the circuitry in back body 12 to an AC power source.

Figure 4A:
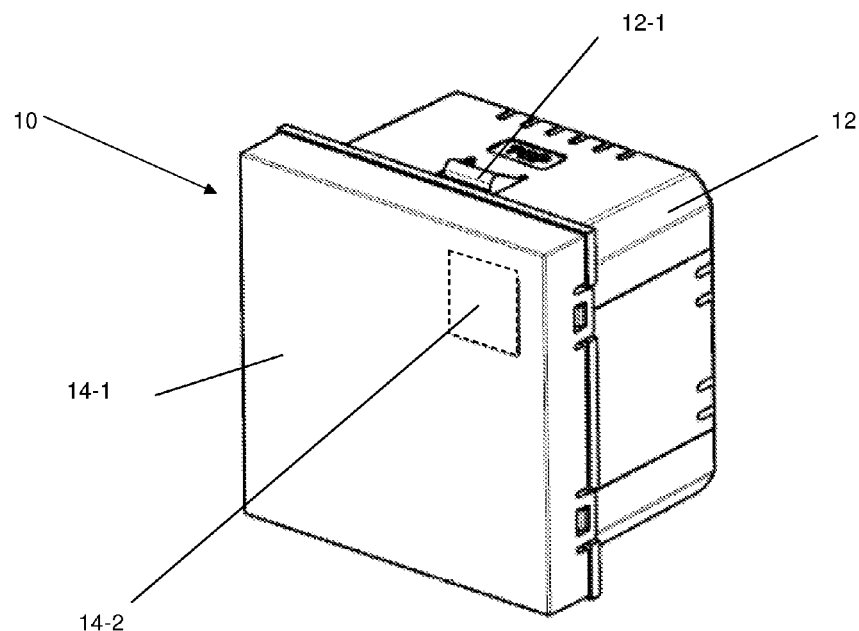
FIGS. 4A-4B are perspective views of the device in accordance with another embodiment of the present invention.
Figure 4B:
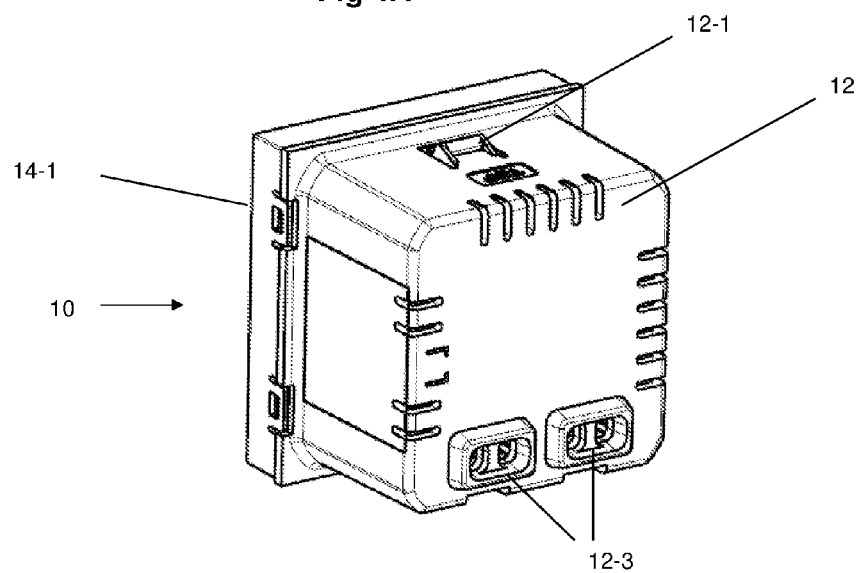

Referring to FIGS. 4A-4B, perspective views of the device 10 in accordance with another embodiment of the present invention are disclosed. The same reference numbers used in FIGS. 3A-3B are used here to refer to the same or like parts. The difference between this embodiment and the previous embodiment is that FIGS. 4A-4B show a two module device. Accordingly, the nightlight 10 occupies a portion of frame 10 which must be filled with either a one module device or two modular alignment connectors 20. (See FIGS. 1-2). FIG. 4B is a rear perspective view of the device 10 and further shows a plurality of AC terminals 12-3 used to connect the AC power handling circuitry in back body 12 to an AC power source instead of the pigtail wires used in the other embodiment.

Figure 5A:
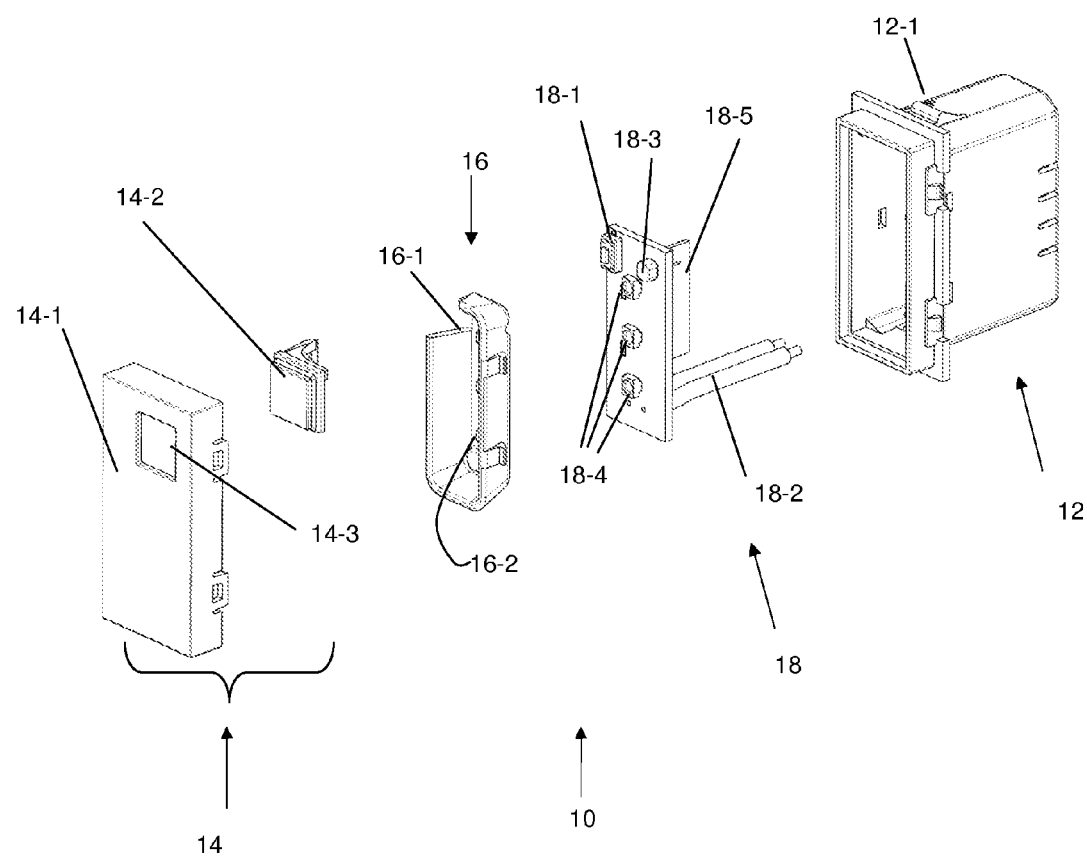
FIGS. 5A-5B are exploded views of the device depicted in FIGS. 3A-3B and 4A-4B.
Figure 5B:
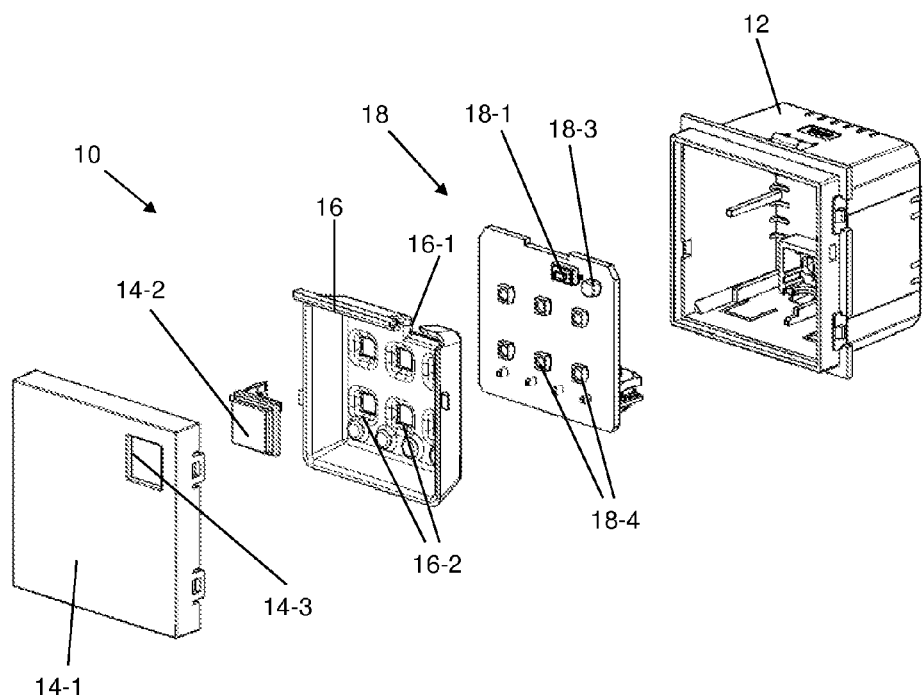

Referring to FIGS. 5A-5B, exploded views of the devices depicted in FIGS. 3A-3B and 4A-4B are disclosed. Referring to FIG. 5A, an exploded view of the device depicted in FIGS. 3A-3B is disclosed. Again, the device 10 includes a back body 12 that includes a lighting printed circuit board (PCB) 18 and a secondary PCB 18-5 disposed therein. The PCB 18 is connected to the pigtail wires 18-2. The AC power handling circuitry, including the rectifier circuit, is disposed on a rear portion of the PCB 18. The secondary PCB 18-5 is arranged at substantially a right angle to the main PCB 18 and includes the lighting control circuit and other such components. The PCB 18 includes the push-button switch 18-1, the ambient light sensor 18-3, and the LEDs 18-4 disposed thereon. The LEDs 18-4 extend through openings 16-2 in the reflector 16. The reflector 16 also includes a notched region 16-1 that is configured to accommodate the switch actuator 14-2. This is an important feature of the invention in that it is employed to eliminate any shadows from being projected up toward the lens 14-2 from below. This feature is described in greater detail below. As described previously, the lens cover 14 includes a lens facet 14-1 that covers substantially the entire front face of the device 10, with the exception of switch opening 14-3 which accommodates the switch actuator 14-2.

FIG. 5B is an exploded view of the two module device 10. The main difference between this embodiment and that depicted in FIG. 5A is that this embodiment is wider (i.e., it is two modules wide). Thus, the control circuit is disposed on a single PCB 18. Moreover, the front face of the PCB 18 includes six (6) LEDs 18-4 which extend through openings 16-2 in the reflector 16. Again, the reflector 16 includes a notched region 16-1 that accommodates the switch actuator 14-2. Further description of this Figure is unnecessary and avoided for brevity's sake, since the same reference numbers used in FIG. 5A are used here to refer to the same or like parts.

Figure 6A:
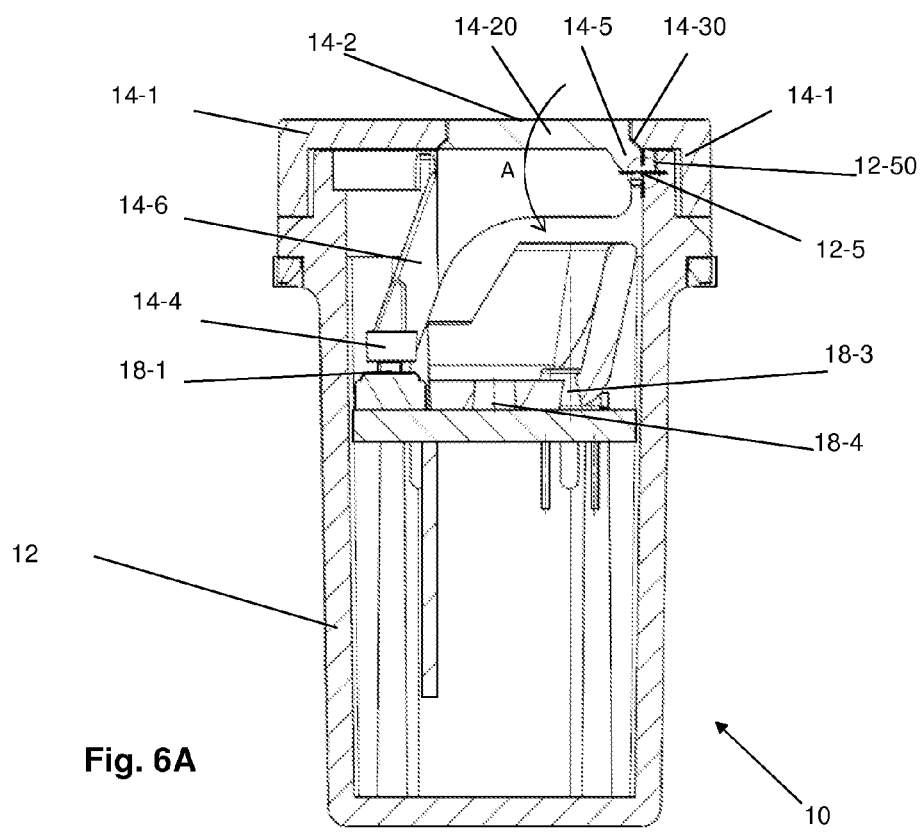
FIGS. 6A-6B include a sectional view of the device depicted in FIGS. 3A-3B.
Figure 6B:
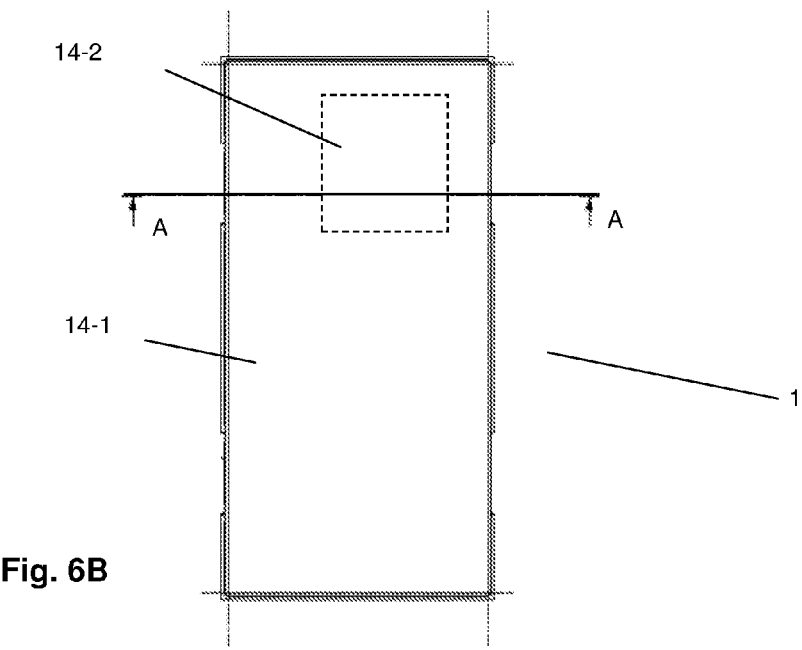

Referring to FIGS. 6A-6B, a sectional view of the device depicted in FIGS. 3A-3B is disclosed. FIG. 6B shows the sectional line through device 10. Referring to FIG. 6A, the relationship between the switch actuator 14-2 and the lens cover 14-1 is clearly shown. In particular, the surface of the lens 14-1 and the switch actuator 14-2 are perfectly flush. Both of these elements (14-1, 14-2) are fabricated from the same material and they are difficult to distinguish one from the other unless the consumer is viewing the front of the device 10 from close by (e.g., a few feet).

The switch actuator 14-2 includes an actuation leg 14-6 that is disposed at an obtuse angle relative to the planar surface of the actuator 14-2. The actuation leg 14-6 further includes a switch pad 14-4 that is disposed over the push-button switch 18-1. Switch 18-1 can get damaged if there is undue force applied to it. That risk is avoided due to the fact that actuation leg 14-6 is at an obtuse angle and is configured to operate as a cantilever. Thus if there is undue force applied to switch actuator 14-2, actuation leg 14-6 simply deflects and does not transmit that force to switch 18-1.

In another aspect, the other side of the switch actuator 14-2 includes a hinge portion 14-5 that is configured to mate with a bearing surface 12-5 formed in back body 12. The hinge portion 14-5 extends downwardly from the planar lens portion 14-20 (of the switch actuator 14-2) and into a pocket 12-50 formed by the switch opening 14-3 and the bearing surface 12-5. Note that the opening 14-3 has a beveled edge 14-30 which substantially conforms to the shape of the hinge portion 14-5. In other words, both the beveled edge 14-30 and the hinge 14-5 are approximately at 45 degree angles. Briefly then, the switch actuation hinge 14-5 is substantially constrained within the pocket 12-50 such that it is configured to rotate in the direction indicated by arrow A. When the switch actuator 14-2 is pressed downwardly, the push button switch 18-1 is actuated. When the switch actuator 14-2 is released, the electronic switch button 18-1 includes a spring force that causes the switch actuator 14-2 to return to its rest position flush with the lens surface 14-1.

As noted above, the lens cover 14-1 and the switch actuator 14-2 are fabricated from the same lens material and thus are difficult to distinguish one from the other unless the consumer is viewing the front of the device 10 from close by (e.g., a few feet). This is also true when the LEDs 18-4 are illuminated. In FIG. 6A, note that the LEDs 18-4 are disposed substantially along a center line of the PCB 18. The electronic switch 18-1 is disposed on one side of the LEDs 18-4 and the sensor 18-3 is disposed on the other. The actuation leg 14-6 angles away from the LEDs 18-4 and rests over electronic switch 18-1. Accordingly, when the LEDs 18-4 are illuminated, the actuation leg 14-6 does not cast any shadow on the front lens cover 14-2. And because the lens cover 14-2, the switch actuator lens 14-20, and the actuation leg 14-6 are formed from the same material (such as a polycarbonate) the light emitted by the diodes is evenly diffused by these elements to present a pleasing uniform illumination pattern.

In reference to the ambient light sensor 18-3, there is also no light shielding structure that casts a shadow onto the lens cover 14-2 because the light controller interrogates the ambient light sensor during a portion of the negative half cycle of the AC line cycle and turns the LEDs 18-4 ON during a portion of the positive half cycle of the AC line cycle. Thus, the LEDs are periodically turned off for durations too short to notice when light sensor 18-3 is to be read. Thus the LEDs cannot give false indication of the true ambient lighting condition. Accordingly, no sensor light shielding or positioning away from the LEDs is necessary; the present invention employs instead an electronic barrier between the sensor and the LEDs. Stated differently, the present invention uses the entire lens 14-2 to direct light into the ambient environment with a uniformly diffused illumination pattern.

Figure 7A:
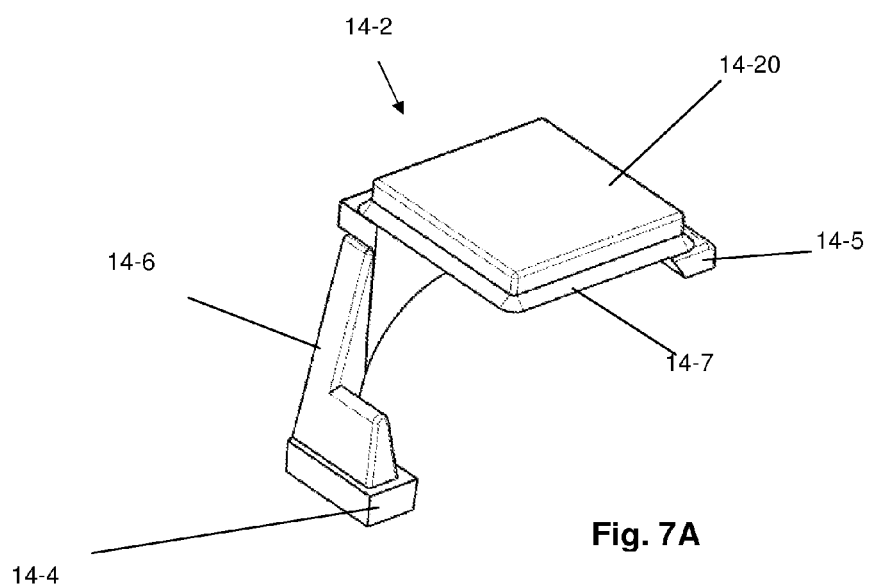
FIGS. 7A-7B include various views of a switch actuator in accordance with the present invention.
Figure 7B:
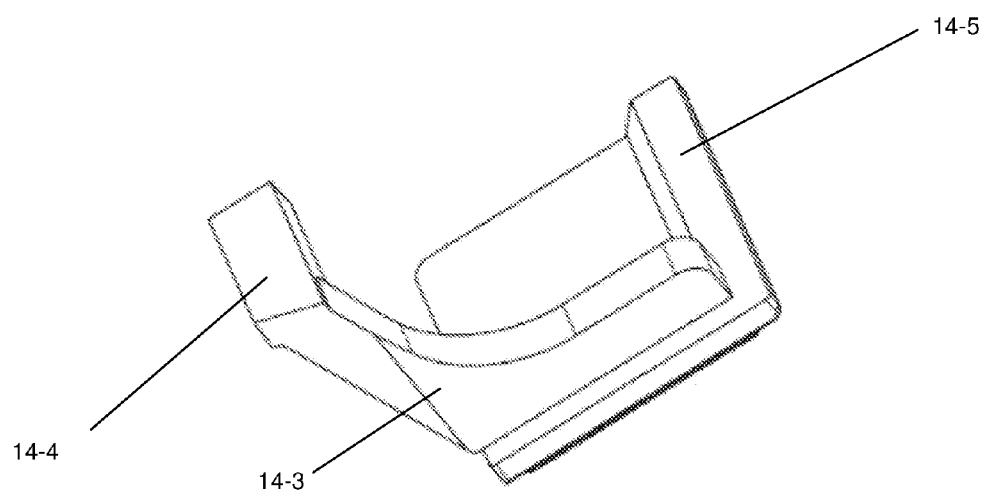

Referring to FIGS. 7A-7B, various views of the switch actuator 14-2 are disclosed. The switch actuator 14-2 includes a raised planar lens surface 14-20 that is configured to be flush with the cover lens 14-1 when in situ. The switch actuator further includes a rim portion 14-7 that abuts the underside of the lens cover 14-1 when the actuator is in place. In this view, the hinge portion 14-5 is shown to extend downwardly from the planar lens surface 14-20 as described above. The actuator leg 14-6 is coupled to the planar switch lens 14-20 at one corner thereof and extends downwardly against the inside wall of the back body 12 (not shown in this view) so as to not obstruct the LED lighting (as described previously).

FIG. 7B shows the underside of the switch actuator 14. This view illustrates the actuation leg 14-6 and switch pad 14-4 disposed at only one corner of the actuator 14-2. Of course, the structural stability is provided by the hinge portion 14-5 which is constrained by the pocket 12-50 (as described previously).

Figure 8:
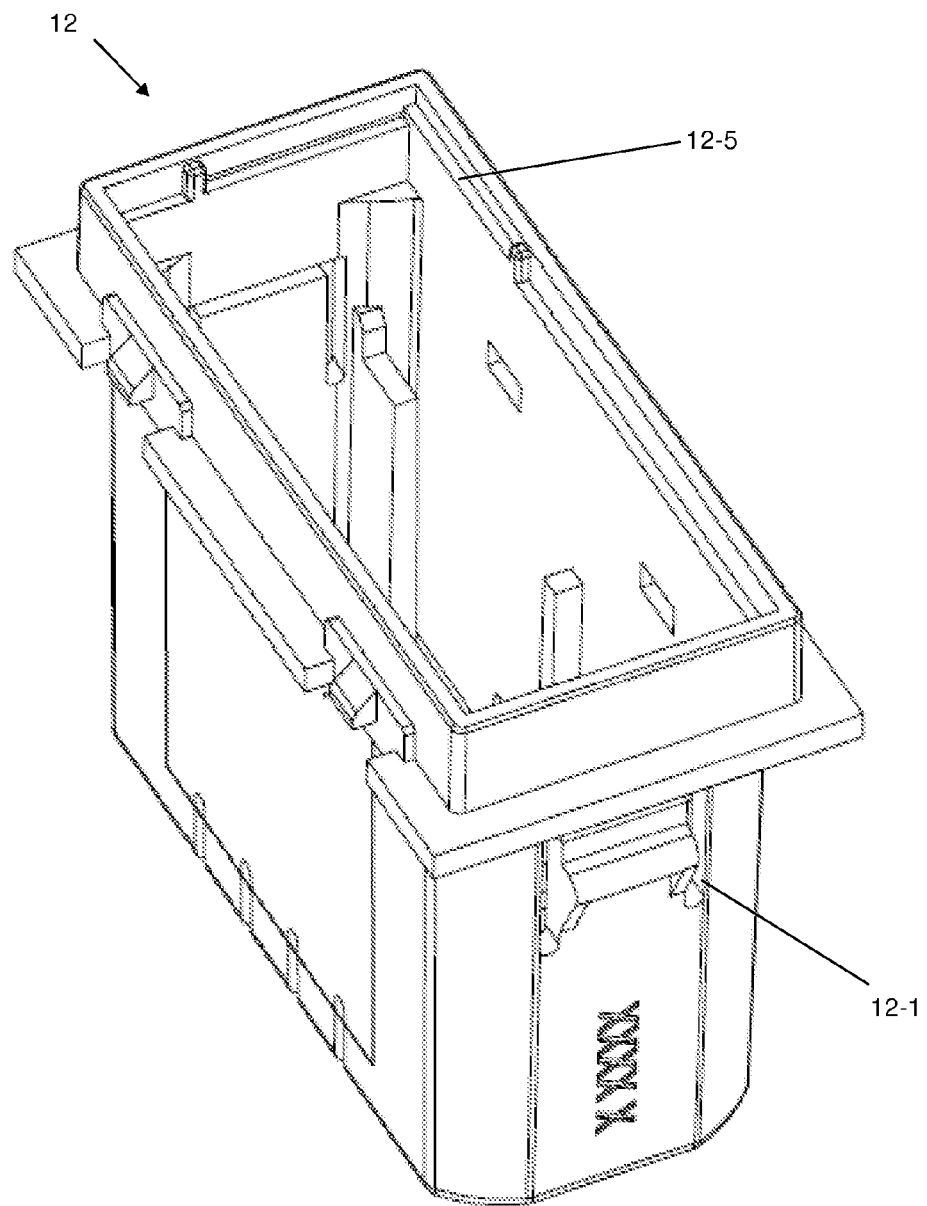
FIG. 8 is a perspective view of the back body portion of the device depicted in FIGS. 3A-3B.

Referring to FIG. 8, a perspective view of the back body portion of the device depicted in FIGS. 3A-3B is disclosed. This view clearly shows the bearing surface 12-5 that supports the hinge portion 14-5 and forms the bottom part of the pocket 12-50 that constrains the hinge 14-5.

Figure 9A:
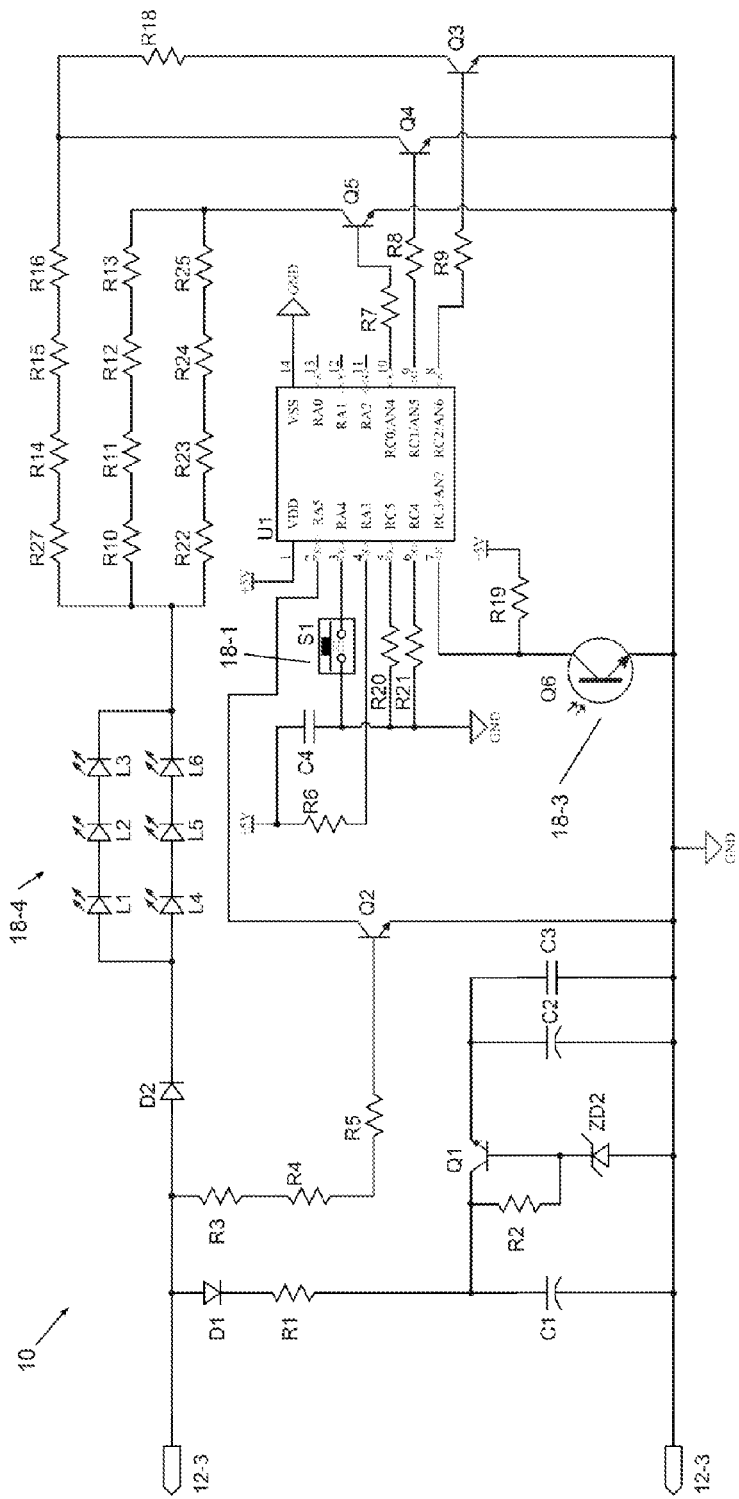
FIGS. 9A-9B are schematic view of the lighting circuit in accordance with an embodiment of the invention.
Figure 9B:
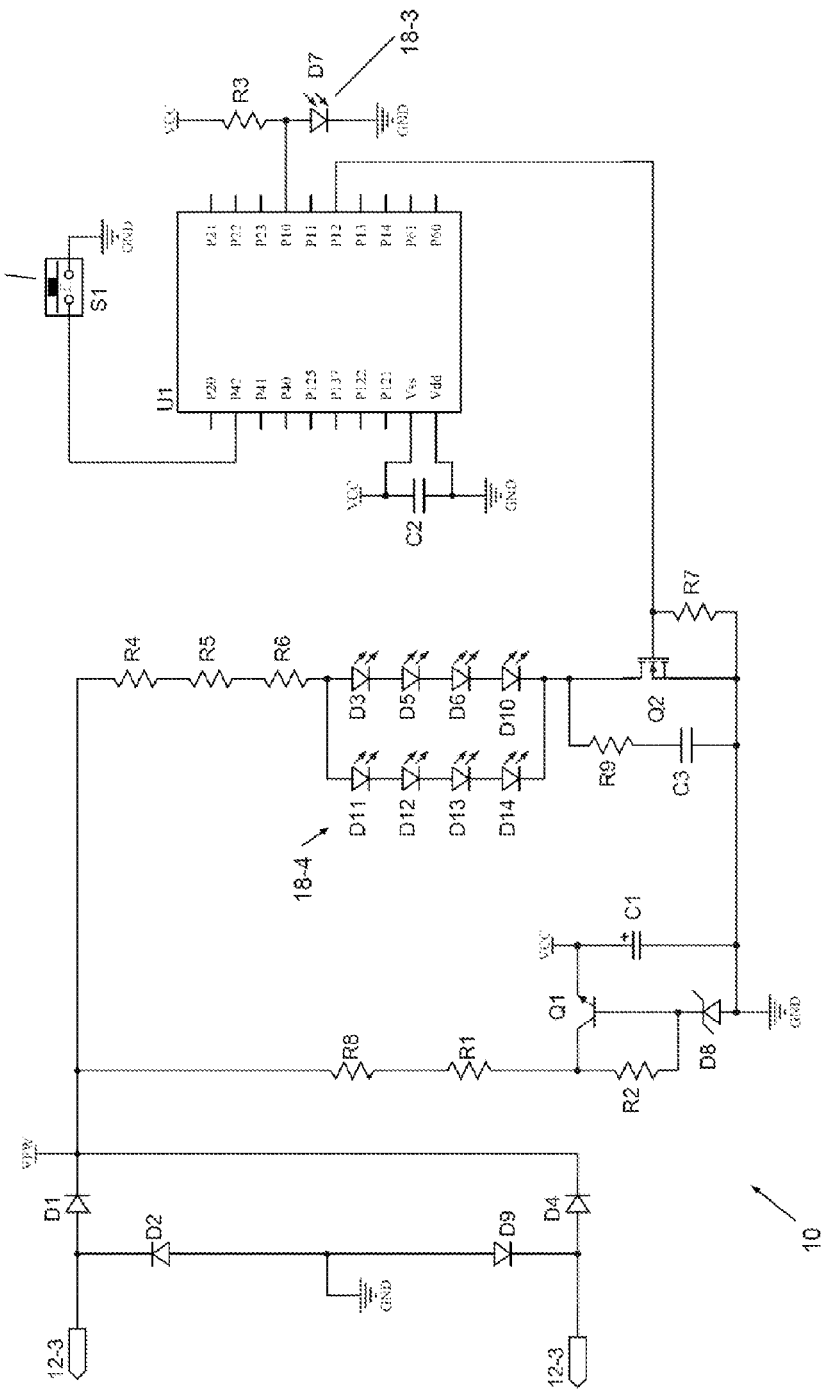

As embodied herein and depicted in FIGS. 9A-B, schematic views of the lighting circuit 18 in accordance with embodiments of the invention are disclosed. Although the schematics directly apply to the device depicted in FIG. 5B, they also apply to the device depicted in FIG. 5A. The basic difference between the two embodiments is the number of LEDs employed. AC power is coupled to the hot and neutral terminals 12-3. One terminal is coupled in series with a diode D2, which is in turn coupled to the lighting LEDs (L1-L6).

Thus, the lighting LEDs (L1-L6) are only ON during the positive half cycle of the AC line cycle. A second diode D1 is coupled between the line hot and capacitor C1, and provides rectified power to the sensor Q6. Basically, the diode D1 rectifies the AC power and charges capacitor C1 up during the positive half cycle.

Circuit 18 includes a 5 VDC regulated power supply consisting of resistor R2, diode ZD2, transistor Q1 and capacitors (C2,C3.) The regulated power supply provides the DC voltage during the negative half cycle. The LEDs L1-L6 are off during the negative half cycle. During the negative half-cycle the controller 180 interrogates the ambient light sensor Q6 (when LEDs (L1-L6) are off). Transistor Q2 is coupled to the AC terminal 12-3 by way of resistors R3-R5. Thus, the transistor Q2 is employed to provide the controller 180 with a zero-cross signal that allows the controller to know when to interrogate the ambient light sensor.

The controller 180 is implemented using any suitable device, but in one embodiment of the present invention, the embedded controller 180 is an 8-bit CMOS based microcontroller that executes instructions in approximately 200 nanoseconds and includes 8 channels for the 10-bit Analog-to-Digital (A/D) converter one or more comparators and at least 128 bytes of EEPROM data memory as well as FLASH program memory.

The control circuit 180 is coupled to the ambient light sensor Q6 and is programmed to sample the sensor output only on the negative half cycle of the AC line cycle to thereby implement an electronic light barrier. As alluded to above, the zero cross of the AC line cycle is provided by transistor Q2. Briefly, the transistor Q6 provides controller 180 with ON/OFF decisions.

The control circuit 180 works in conjunction with the switch S1 (actuated by 14-2) and the light sensor Q6. The controller 180 is programmed to observe two different ambient light thresholds (T1, T2). One can imagine that this cycle is controlled by the alternating phases of the day and night cycle. Thus, when night approaches, the ambient light is declining and it reaches the lower threshold T1, and the controller 180 turns the LEDs (L1-L6) ON (at a level that is controlled by the switch S1) until the ambient light begins to increase again, i.e., at daybreak. As the ambient light is increasing, it will pass the lower threshold T1 and the LEDs will remain ON. It is not until the ambient light reaches the higher threshold T2 that the controller 180 turns the LEDs OFF. In one embodiment of the present invention, the controller 180 is programmed to delay the extinguishing of the LED light by four seconds after the second threshold. During the four second time frame, the lights fade until they are completely extinguished.

The switch S1 is coupled to the controller 180 and is configured to select the light level of the LEDs (L1-L6) from OFF, LOW, MEDIUM or HIGH settings. In the OFF setting, transistors Q3, Q4, and Q5 are OFF. In the low setting, pin 8 of the controller 180 turns ON transistor Q3. The emitter of Q3 is connected to various resistors that limit the current passing through the LEDs such that they emit a low level of illumination. When the user depresses switch S1 again, the controller turns pin 9 ON while turning pin 8 OFF to turn transistor Q4 ON. In this case, a smaller amount of resistance is disposed in series with the Q4 emitter and this allows more current to flow through the LEDs (L1-L6). Another depression of switch S1 turns transistor Q5 ON, and Q4 OFF. Again, the resistance connected to the Q5 emitter is smaller than before, and thus, the LEDs shine at their brightest level.

Referring to FIG. 9B an alternate schematic diagram of the nightlight device 10 depicted in FIGS. 3A-3B is disclosed. The operation of this circuit is similar to FIG. 10A except a single semiconducting device (FET Q2) controls the nightlight LEDs (L1-L6) as opposed to the three transistors. FET Q2 is driven by pin 12 of controller 180. Processor 180 dims nightlight LEDs (L1-L6) using pulse width modulation (PWM.) By way of non-limiting example, switch S1 is tapped to step the duty cycle through OFF-LOW-MEDIUM or HIGH brightness. Alternatively, S1 is tapped to start the duty cycle of the PWM signal sweeping through off to maximum brightness and tapped again when the desired brightness is achieved. The desired brightness is then held in memory. Alternatively, S1 is single-tapped to step the duty cycle and held steadily to sweep the duty cycle. Alternatively, S1 is tapped to turn the LEDs on and off and held steadily to change the brightness either in a stepped or a swept manner.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical device configured to be installed within a device box, comprising:
   a housing including a plurality of terminals configured to be coupled to an AC power source;
   a control circuit disposed in the housing, the control circuit including a processing circuit, an electronic switch, a plurality of light emitting elements and an ambient light sensor disposed on a substrate, the ambient light sensor being disposed proximate the plurality of light emitting elements on the substrate, the ambient light sensor being configured to provide the processing circuit with ambient light data, the processing circuit being configured to provide an electronic barrier between the plurality of light emitting elements and the ambient light sensor such that the operation of the ambient light sensor is not contaminated by light emitted by the plurality of light emitting elements;

a cover assembly coupled to the housing and including a lens element covering substantially the entire front face of the device, the lens element including an opening accommodating a switch actuator coupled to the electronic switch, the lens element and the switch actuator being comprised of a diffusing material, the lens element and the switch actuator being disposed over the plurality of light emitting elements such that the light emitted by the plurality of light emitting elements is diffused by the lens element and the switch actuator to emit a substantially uniform illumination without any shadow or hot spot artifacts being visible on either the lens element or the switch actuator.

2. The device of claim 1, wherein the processing circuit provides the electronic barrier by energizing the plurality of light emitting elements and the ambient light sensor during alternating times.

3. The device of claim 2, wherein the processing circuit is configured to turn the plurality of light emitting elements ON during a portion of a first half cycle polarity of the AC power source and interrogate the ambient light sensor during a portion of a second half cycle polarity of the AC power source.

4. The device of claim 3, wherein the first half cycle polarity is positive.

5. The device of claim 3, wherein the second half cycle polarity is negative.

6. The device of claim 1, wherein the ambient light data is used by the control circuit to turn the plurality of light emitting elements ON when the ambient light is less than or equal to a first threshold and turn the plurality of light emitting elements OFF when the ambient light is greater than or equal to a second threshold.

7. The device of claim 6, wherein the first threshold and the second threshold correspond to different ambient light levels.

8. The device of claim 7, wherein the second threshold is greater than the first threshold.

9. The device of claim 8, wherein the control circuit is configured to drive the plurality of light emitting elements to fade over a predetermined period of time to transition from ON to OFF.

10. The device of claim 1, wherein the electronic switch is configured to direct the processing circuit to select one of a predetermined number of illumination levels or a continuum of illumination levels.

11. The device of claim 10, wherein the predetermined number of illumination levels equals three illumination levels.

12. The device of claim 1, wherein the switch actuator includes a hinge portion disposed at a first side thereof, the hinge portion being rotationally fixed to a side wall portion of the housing such that the switch actuator rotates in response to a user actuation.

13. The device of claim 12, wherein the switch actuator includes an actuator leg disposed at a second side thereof, the actuator leg being configured to actuate the electronic switch in response to the user actuation.

14. The device of claim 13, wherein the switch actuator includes a substantially planar surface disposed substantially flush with respect to the lens element.

15. The device of claim 13, wherein the actuator leg extends away from the planar surface at an oblique angle such that the actuator leg does not cast a shadow on the lens element from light rays emanating from the plurality of light emitting elements.

16. The device of claim 12, wherein the lens element and the side wall portion are configured to form a socket, the hinge portion being retained within the socket.

17. The device of claim 16, wherein the lens element includes an angular portion substantially conforming to the hinge portion within the socket.

18. A system including the electrical wiring device of claim 1, the system comprising: a frame configured to be mounted to a device wall box, the frame including a first edge formed around a peripheral portion of the frame, the first edge being configured to abut a structural surface disposed around the device wall box, the frame assembly further including a frame opening corresponding to at least one gang opening, the frame opening substantially defining a second edge configured to extend inwardly toward the device wall box interior such that the frame opening provides sole access to the device wall box interior; and the electrical wiring device of claim 1, the device being configured to be coupled within the frame opening to complete the system enclosure such that the device wall box interior is substantially inaccessible.

19. The system of claim 18, further comprising an aesthetic overlay configured to be removably coupled to the frame assembly, the aesthetic overlay including an overlay opening configured to provide access to at least a portion of the cover assembly.

20. The system of claim 18, where the electrical wiring device is configured to be a one module device or a two module device.

* * * * *